United States Patent
Izkovsky et al.

(10) Patent No.: US 9,492,756 B2
(45) Date of Patent: Nov. 15, 2016

(54) SYSTEM AND METHOD FOR ANALYZING A DIGITALIZED MUSICAL PERFORMANCE

(75) Inventors: Roey Izkovsky, Ramat Gan (IL); Yuval Kaminka, Givat-Shmuel (IL); Yigal Kaminka, Kfar-Saba (IL)

(73) Assignee: Joytunes Ltd., Kfar-Saba (IL)

( * ) Notice: Subject to any disclaimer, the term of this patent is extended or adjusted under 35 U.S.C. 154(b) by 419 days.

(21) Appl. No.: 13/395,802

(22) PCT Filed: Sep. 14, 2010

(86) PCT No.: PCT/IB2010/002587
§ 371 (c)(1),
(2), (4) Date: Mar. 13, 2012

(87) PCT Pub. No.: WO2011/030225
PCT Pub. Date: Mar. 17, 2011

(65) Prior Publication Data
US 2012/0295679 A1 Nov. 22, 2012

Related U.S. Application Data

(60) Provisional application No. 61/241,976, filed on Sep. 14, 2009.

(51) Int. Cl.
*A63F 13/00* (2014.01)
*A63F 13/814* (2014.01)
(Continued)

(52) U.S. Cl.
CPC ........... *A63F 13/814* (2014.09); *A63F 13/215* (2014.09); *G09B 15/023* (2013.01);
(Continued)

(58) Field of Classification Search
CPC .. G09B 15/023; G09B 15/00; G09B 15/003; G09B 15/02; G09B 15/04; G10H 2210/091; G10H 2220/015; G10H 1/361; G10H 1/368; G10H 1/0025; G10H 1/0058; G10H 1/22; G10H 1/26; G10H 2210/031; G10H 2210/066; G10H 2220/011; G10H 2220/145; A63F 13/10; A63F 2300/1062; A63F 2300/638; A63F 2300/8047; A63F 13/06; A63F 2300/305; A63F 2300/61
USPC .............................................. 463/7; 434/321
See application file for complete search history.

(56) References Cited

U.S. PATENT DOCUMENTS 5,225,618 A  7/1993 Wadhams
5,413,355 A * 5/1995 Gonzalez ..................... 273/429
(Continued)

FOREIGN PATENT DOCUMENTS

CN  101551997 A  10/2009
EP  1465150 A1  10/2004
(Continued)

*Primary Examiner* — Justin Myhr
(74) *Attorney, Agent, or Firm* — Peter A. Nieves; Sheehan Phinney Bass & Green PA

(57) ABSTRACT

A system and method for improving musical education through use of a game, is provided. The method includes the steps of: receiving electrical signals associated with a musical piece provided by a user of the game; converting the electrical signals into digital samples; and analyzing the digital samples with use of auxiliary information, for purposes of improving signal analysis accuracy, resulting in determining various parameters of the musical piece provided by the user, wherein the auxiliary information is a-priori data related to at least one element selected from the group consisting of a musical instrument being played, a technical environment, the game, and information regarding the user of the game. Visual and/or audio feedback may also be provided to the user regarding the musical piece that they are providing.

14 Claims, 11 Drawing Sheets

(51) Int. Cl.
*G10H 1/36* (2006.01)
*A63F 13/215* (2014.01)
*G09B 15/02* (2006.01)
*A63F 9/24* (2006.01)

(52) U.S. Cl.
CPC ...... *G10H 1/368* (2013.01); *A63F 2009/2432* (2013.01); *A63F 2300/8047* (2013.01); *G10H 2210/031* (2013.01); *G10H 2210/056* (2013.01); *G10H 2210/066* (2013.01); *G10H 2210/091* (2013.01); *G10H 2220/015* (2013.01)

(56) References Cited

U.S. PATENT DOCUMENTS

| | | | |
|---|---|---|---|
| 5,563,358 A | 10/1996 | Zimmerman | |
| 5,739,457 A * | 4/1998 | Devecka | 84/743 |
| 6,066,791 A | 5/2000 | Renard | |
| 6,156,965 A | 12/2000 | Shinsky | |
| 6,963,841 B2 * | 11/2005 | Handal et al. | 704/270 |
| 2002/0002900 A1 * | 1/2002 | Cho | 84/738 |
| 2004/0177744 A1 | 9/2004 | Strasser | |
| 2004/0221707 A1 | 11/2004 | Hiratsuka | |
| 2004/0237756 A1 | 12/2004 | Forbes | |
| 2006/0009979 A1 * | 1/2006 | McHale | A63F 13/10 704/270 |
| 2007/0256551 A1 * | 11/2007 | Knapp et al. | 84/722 |
| 2008/0200224 A1 | 8/2008 | Parks | |
| 2009/0038468 A1 * | 2/2009 | Brennan | 84/609 |
| 2009/0191932 A1 * | 7/2009 | Chiu et al. | 463/7 |
| 2010/0137049 A1 | 6/2010 | Epstein | |
| 2010/0300264 A1 * | 12/2010 | Foster | G10H 1/0058 84/610 |

FOREIGN PATENT DOCUMENTS

| | | |
|---|---|---|
| GB | 2403662 A | 1/2005 |
| GB | 2433349 A | 3/2010 |
| WO | WO02093864 | 11/2002 |
| WO | WO2006042358 | 4/2006 |
| WO | WO2008061169 | 5/2008 |
| WO | WO 2008/103269 A1 | 8/2008 |
| WO | WO2009156901 | 12/2009 |

* cited by examiner

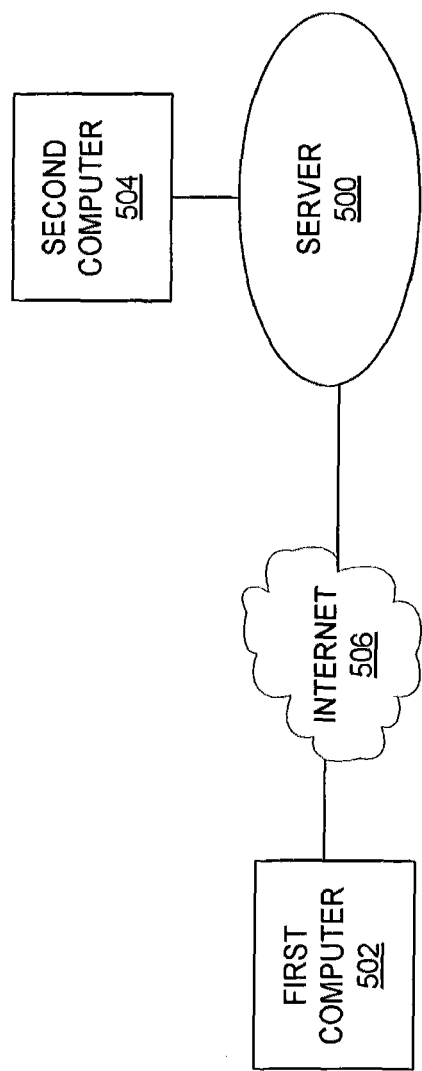

SYSTEM AND METHOD FOR ANALYZING A DIGITALIZED MUSICAL PERFORMANCE

CROSS-REFERENCE TO RELATED APPLICATIONS

This application claims priority to U.S. Provisional Patent Application entitled, "MUSICAL EDUCATION GAME APPLICATION," having Ser. No. 61/241,976, filed Sep. 14, 2009, which is entirely incorporated herein by reference.

FIELD OF THE INVENTION

The present invention is related to musical education, and more particularly is related to the improvement of musical education through increasing practice motivation and immediate feedback.

BACKGROUND OF THE INVENTION

The first steps of learning to play a musical instrument typically focus on acquiring the basic coordination, knowledge and skills needed for playing simple melodies. For most people, these steps involve numerous hours of technical unrewarding exercises, even more so for children that lack many of the motor skills adults have. Moreover, children find it difficult to concentrate on, what they refer to as boring, routine exercises. The main challenges of music teachers, in addition to teaching the musical knowhow, include the building of positive motivation, stamina, and a balanced process of cognitive development among young players. Not surprisingly, many beginners avoid practicing and eventually stop playing altogether if not regularly encouraged by their surroundings.

On the other hand, it has been proven that people are highly motivated when it comes to playing games. Professional literature presents an abundant number of examples of how games can assist in formal education, such as in schools, and in informal education. The challenge that parents, as well as educators, normally face is to focus children on games and tasks with educational benefit and to limit their interaction with time-consuming games of questionable advantages.

There are numerous examples of popular games drawing millions of children across the world. One noteworthy example is "Guitar Hero" (for PlayStation®, Wii®, and other gaming controllers stations). In this game, the user uses a plastic guitar-shaped controller to hit targets on the screen. Though evidently enjoyable and addictive, there is little to be gained in this game in terms of playing a real guitar.

Thus, a heretofore unaddressed need exists in the industry to address the aforementioned deficiencies and inadequacies.

SUMMARY OF THE INVENTION

Embodiments of the present invention provide a system and method for improving musical education. Briefly described, in architecture, one embodiment of the system, among others, can be implemented as follows. A system for improving musical education through use of a game contains a memory and a processor configured by the memory to perform the steps of receiving electrical signals associated with a musical piece provided by a user of the game; converting the electrical signals into digital samples; and analyzing the digital samples with use of auxiliary information, for purposes of improving signal analysis accuracy, resulting in determining various parameters of the musical piece provided by the user, wherein the auxiliary information is a-priori data related to at least one element selected from the group consisting of a musical instrument being played, a technical environment, the game, and information regarding the user of the game.

A method for improving musical education through use of a game, is provided, which includes the steps of: receiving electrical signals associated with a musical piece provided by a user of the game; converting the electrical signals into digital samples; and analyzing the digital samples with use of auxiliary information, for purposes of improving signal analysis accuracy, resulting in determining various parameters of the musical piece provided by the user, wherein the auxiliary information is a-priori data related to at least one element selected from the group consisting of a musical instrument being played, a technical environment, the game, and information regarding the user of the game.

It is noted that the system and method need not be provided within a game environment. The system and method makes use of the significant natural motivation of children and adults to play games in order to perform technical, time-consuming, and tiresome exercises that constitute a fundamental component of the learning process. The system and method performs operations and supplies feedback based on audio input in a way best fit for developing musical skills and knowledge while maintaining an enjoyable and challenging experience.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 11 is a schematic diagram illustrating a multiple player version of the present system and method where the system and method is provided via a server.

DETAILED DESCRIPTION

Figure 1:
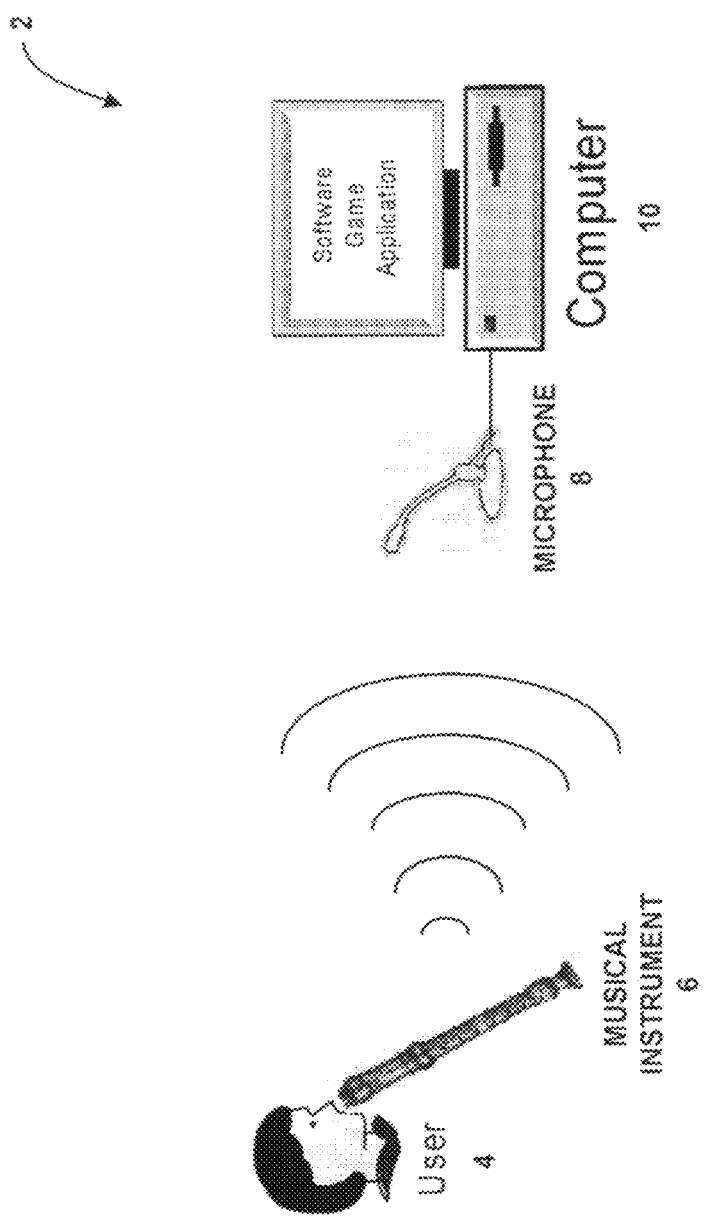
FIG. 1 is a schematic diagram illustrating an environment or network in which the present system and method may be provided.

The present system and method is provided to improve musical education through increasing of practice motivation and immediate feedback. FIG. 1 is a schematic diagram illustrating an environment or network 2 in which the present system and method may be provided. As shown by FIG. 1 the environment contains a user 4 playing a musical instrument 6. While FIG. 1 provides the example of the musical instrument being a woodwind instrument tool, one having ordinary skill in the art would appreciate that any musical instrument may be supplemented, whether the instrument is a woodwind instrument or not. In addition, the present system and method may even be provided for use in developing musical skills that are not associated with instruments, such as, but not limited to, vocal training and whistling. The environment or network 2 (hereafter referred to as a network 2) also contains a microphone 8 or other device for receiving sound produced by the musical instrument 6. The microphone 8 transforms received sound waves and converts the sound waves into electrical signals.

In addition, a computer 10 is provided within the network 2. The computer 10 receives the electrical signals from the microphone 8, interprets the electrical signals as described in detail hereinbelow, and runs a game application in accordance with the interpreted electrical signals, also as described in detail hereinbelow.

It should be noted that the computer 10 may be any device having a memory and a processor. While the following provides the example of the computer 10 being a general purpose computer, as illustrated by the schematic diagram of FIG. 2, one having ordinary skill in the art would appreciate that the computer 10 may instead take the form of a different device such as, but not limited to, a game controller box, a smart phone, a personal data assistant (PDA), or any other device having a memory and processor, which is also capable of receiving electrical signals from the microphone 8. It should also be noted that the microphone 8 may be located within the computer 10 itself instead of located separately as shown by FIG. 1.

In addition, it should be noted that in accordance with an alternative embodiment of the invention, the musical instrument 6 may have a direct connection to the computer 10 for transmitting audio signals to the computer 10 without need of the microphone 8. In such an embodiment, the computer 10 may instead contain software or hardware therein for transforming received sound waves into electrical signals. It should also be noted that the connection of the instrument could be without going through the sound waves at all. A digital midi connection, for example, or other hardware could provide input in electrical signals and even to more sophisticated signals such as midi.

Figure 2:
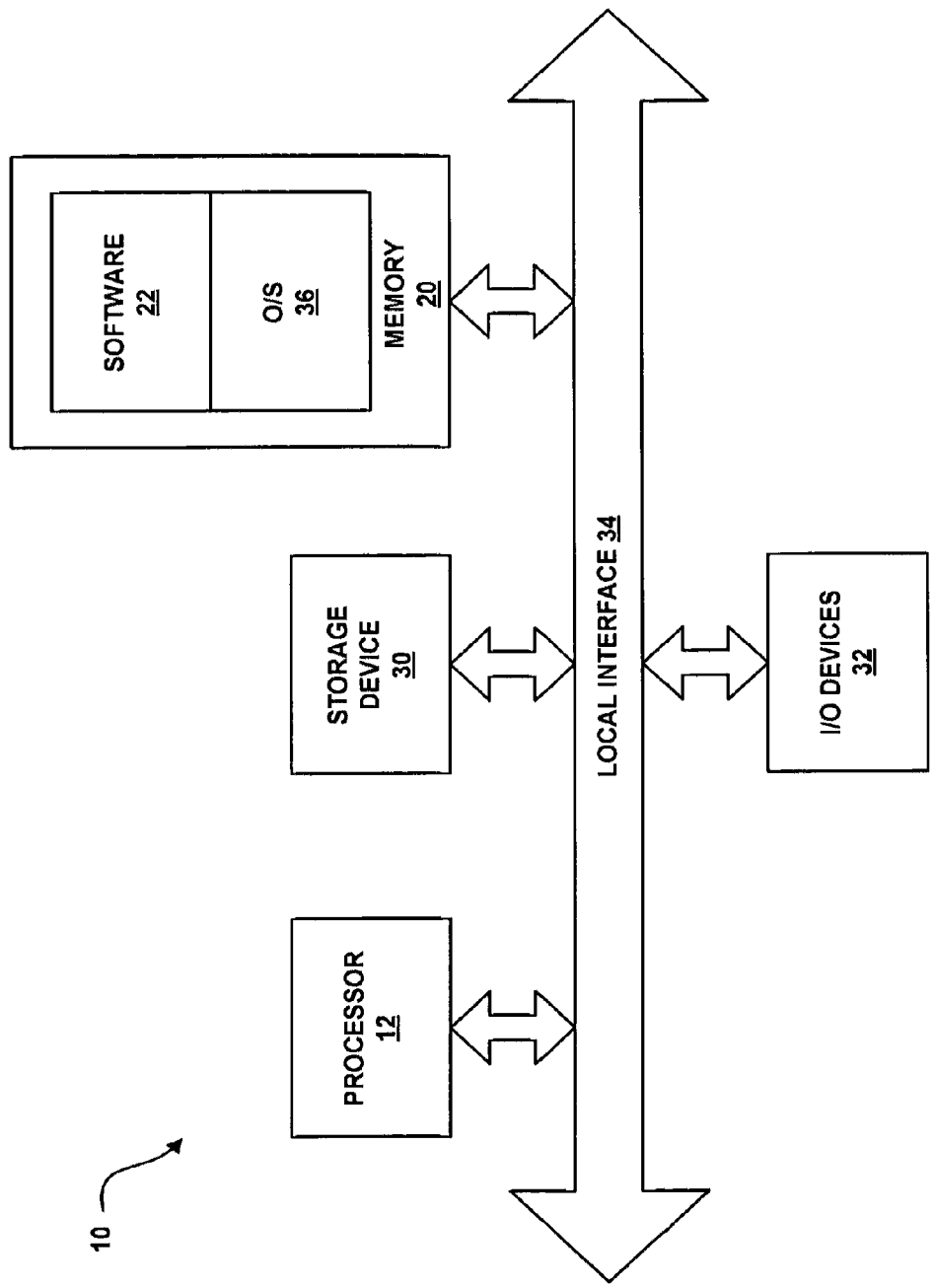
FIG. 2 is a block diagram further illustrating the computer of FIG. 1.

FIG. 2 is a block diagram further illustrating the computer 10 of FIG. 1, in accordance with a first exemplary embodiment of the invention. Functionality performed by the computer 10 is partially implemented in software, as an executable program, where the computer 10 may be a general-purpose digital computer, such as a personal computer (i.e., PC; IBM-compatible, Apple-compatible, or otherwise), workstation, minicomputer, or mainframe computer.

Generally, in terms of hardware architecture, as shown in FIG. 2, the computer 10 contains a processor 12, a memory 20, and one or more input and/or output (I/O) devices 32 (or peripherals) that are communicatively coupled via a local interface 34.

The local interface 34 can be, for example but not limited to, one or more buses or other wired or wireless connections, as is known in the art. The local interface 34 may have additional elements, which are omitted for simplicity, such as controllers, buffers (caches), drivers, repeaters, and receivers, to enable communications. Further, the local interface 34 may include address, control, and/or data connections to enable appropriate communications among the aforementioned components.

It should be noted that the computer 10 may also have a storage device (e.g., hard disk) 30 therein. The storage device 30 may be any nonvolatile memory element (e.g., ROM, hard drive, tape, CDROM, etc.). In accordance with an alternative embodiment of the invention, the storage device 30 may be a volatile memory element, although the loss of memory contents when power is removed may not be desirable. In addition, it should be noted that in accordance with an alternative embodiment of the invention, data stored within the storage device 30 as described herein, may instead be stored in a different location such as, for example, at a remote location separate from the computer 10.

The storage device 30 has auxiliary information stored therein. In accordance with the present invention, auxiliary information is defined as a-priori data regarding the musical instrument being played, the technical environment, and the game as described herein. A-priori data is used by the computer 10 for improving audio recognition, and includes, for example, general statistical characteristics of specific musical instruments being used by a user, the expected tones to be played, expected volume and duration the user plays at each moment, background music accompaniment being played by computer speakers, and other noise measurements on the physical environment. Other examples of a-priori data may include, but are not limited to, information on the player itself, such as gender, level of expertise, and playing method preferences. There are, of course, many other examples of a-priori data and the present invention is not intended to be limited to the examples provided herein.

The use of auxiliary information allows for the use of non-conventional information in music signal analysis, such as, for example, but not limited to, what instrument is supposed to be played and what note is supposed to be played at a specific time. By using auxiliary information, identification errors are strongly reduced. As a result, the signal analysis process described herein is not performed with a purely theoretic-generic point of view, but instead, a-priori knowledge is used to greatly improve signal analysis accuracy.

A first type of identification error is not identifying a tone as it is being played by the user. The a-priori knowledge of the instrument characteristic helps better define what to expect in the audio samples as the tone is played, thus making it easier to identify when that happened. The knowledge of when the user is supposed to play a given tone is used to look "more carefully" in that time for the expected patterns in the audio sample related to that tone being played.

A second type of identification error is a false-positive, identifying that a tone is being played even though the user does not play it. Here, for example, using the knowledge of the accompaniment background music, its effect can be cancelled out from the audio samples preventing dominant tones in the background music from being falsely identified as played tones.

The abovementioned are only a few possible examples of the usage of auxiliary information in the audio recognition process, merely set forth for a clear understanding of its usage for reducing the number of identification errors.

In addition, the storage device 30 has a model input stored therein. The model input includes tone, volume, duration, and additional characteristics that are ideal for a musical piece being played by the user 4. Of course, the model input may include any combination of the tone, volume, duration, and additional characteristics, since it is not necessary for all of these components to be stored within the storage device 30. It should be noted that in accordance with the present invention, additional characteristics are typically instrument specific, although additional characteristics may not be instrument specific. When instrument specific, additional characteristics may include, but are not limited to, the volume of air that a user puts into a woodwind instrument, the accuracy of the timing and tempo a user plays a percussion instrument, the intensity that the user presses a key on a piano, or the intensity that a user plays a guitar string. In addition, more cross-instrument characteristics may be provided, such as, but not limited to, stability of a tone. Further, as is explained in further detail hereinbelow, the storage device 30 may have stored therein common player mistakes.

The processor 12 is a hardware device for executing the software 22, particularly that stored in memory 20. The processor 12 can be any custom made or commercially available processor, a central processing unit (CPU), an auxiliary processor among several processors associated with the computer, a semiconductor based microprocessor (in the form of a microchip or chip set), a microprocessor, or generally any device for executing software instructions.

The memory 20 can include any one or combination of volatile memory elements (e.g., random access memory (RAM, such as DRAM, SRAM, SDRAM, etc.)) and nonvolatile memory elements. Moreover, the memory 20 may incorporate electronic, magnetic, optical, and/or other types of storage media. Note that the memory 20 can have a distributed architecture, where various components are situated remote from one another, but can be accessed by the processor 12.

The software 22 located in the memory 20 may include one or more separate programs, each of which contains an ordered listing of executable instructions for implementing logical functions. These logical functions are described in detail herein. In the example of FIG. 2, as mentioned above, the software 22 includes functionality performed by the computer 10 in accordance with the present invention and possibly a suitable operating system (O/S) 36. The operating system 36 essentially controls the execution of other computer programs, such as the software 22 associated with the computer 10, and provides scheduling, input-output control, file and data management, memory management, and communication control and related services.

The software 22 is a source program, executable program (object code), script, or any other entity containing a set of instructions to be performed. When a source program, then the program needs to be translated via a compiler, assembler, interpreter, or the like, which may or may not be included within the memory 20, so as to operate properly in connection with the O/S 36. Furthermore, the software 22 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, Ada, and ActionScript.

The I/O devices 32 may include input devices, for example but not limited to, the microphone 8, keyboard, mouse, scanner, touch screen, camera, or other input devices. Furthermore, the I/O devices 32 may also include output devices, for example but not limited to, a printer, display, or other output devices. Finally, the I/O devices 32 may further include devices that communicate both as inputs and outputs, for instance but not limited to, a modulator/demodulator (modem; for accessing another device, system, or network), a radio frequency (RF) or other transceiver, a telephonic interface, a bridge, a router, or other devices that communicate both as inputs and outputs.

When the computer 10 is in operation, the processor 12 is configured to execute the software 22 stored within the memory 20, to communicate data to and from the memory 20, and to generally control operations of the computer 10 pursuant to the software 22. The software 22 and the O/S 36, in whole or in part, but typically the latter, are read by the processor 12, perhaps buffered within the processor 12, and then executed.

When at least a portion of the computer 10 functionality is implemented in software 22, as is shown in FIG. 2, it should be noted that the software 22 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The software 22 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the computer 10 is implemented as a web application, the computer 10 may be hosted in a Web server, where the Web server may be a general-purpose digital computer, such as a personal computer (i.e., PC; IBM-compatible, Apple-compatible, or otherwise), workstation, minicomputer, or mainframe computer as described above.

In another alternative embodiment, where the computer 10 is implemented in hardware, the computer 10 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
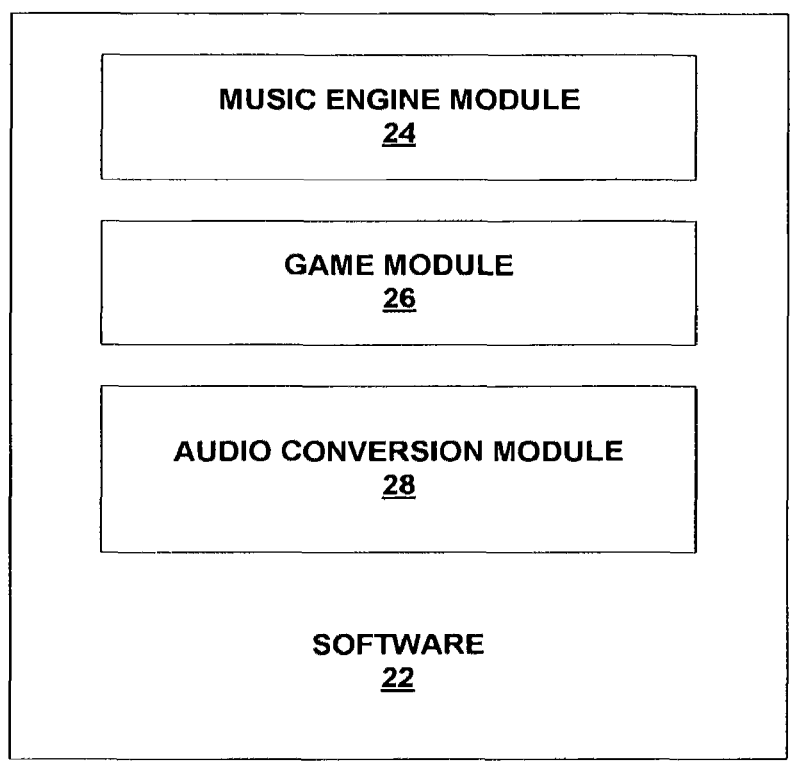
FIG. 3 is a block diagram further illustrating modules within the software of the memory.

FIG. 3 is a block diagram further illustrating modules within the software 22 of the memory 20. Specifically, the software 22 contains a music engine module 24, a game module 26, and an audio conversion module 28. The following description makes reference to the music engine module 24 and the game module 26 and describes functions performed by these modules in detail. The audio conversion module 28 contains known functionality for converting electrical signals received from the microphone 8 into digital samples that can be processed by the music engine module 24.

Figure 4:
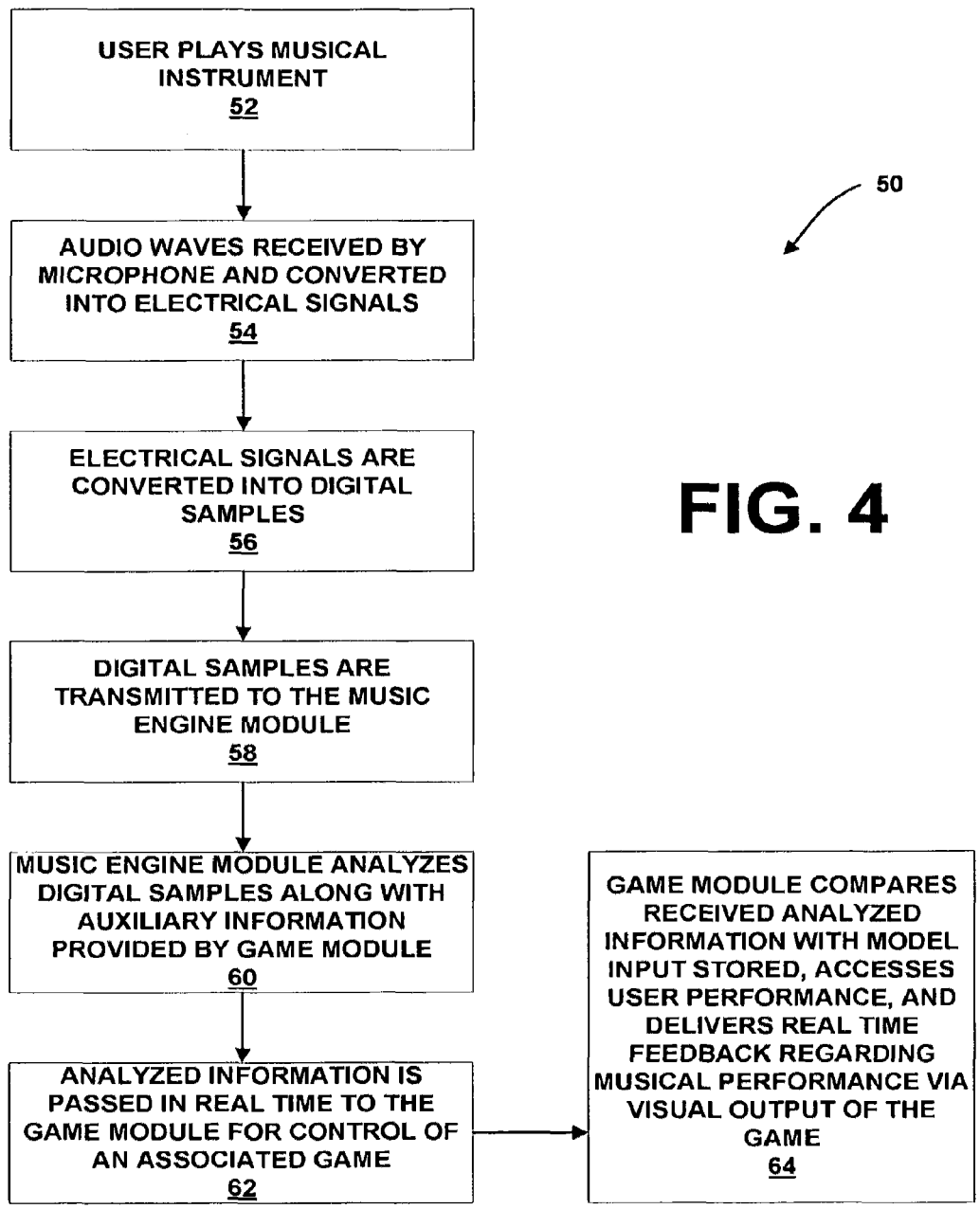
FIG. 4 is a flowchart providing a top-level description of functions provided within the network of FIG. 1 to improve musical education.

FIG. 4 is a flowchart 50 providing a top-level description of functions provided within the network 2 in accordance with the present invention to improve musical education. In this regard, each block represents a module, segment, or portion of code, which contains one or more executable instructions for implementing the specified logical function(s). It should also be noted that in some alternative implementations, the functions noted in the blocks may occur out of the order noted in FIG. 4. For example, two blocks shown in succession in FIG. 4 may in fact be executed substantially concurrently or the blocks may sometimes be executed in the reverse order, depending upon the functionality involved, as will be further clarified hereinbelow. In addition, certain blocks in the flowchart 50 of FIG. 4 may also be missing, thereby alleviating a portion of the functions provided within the network 2.

As shown by block 52, the user of the musical instrument 6 plays the musical instrument 6. Audio waves transmitted by the musical instrument 6 are received by the microphone 8 and converted by the microphone 8 into electrical signals (block 54). The electrical signals are then received by the audio conversion module 28 and converted into digital samples for processing by the music engine module 24 (block 56). Since one having ordinary skill in the art would know how to convert audio waves into electrical signals, and then into digital samples, the present description does not further describe these processes.

As shown by block 58, the digital samples are transmitted to the music engine module 24. The music engine module 24 then analyzes the digital samples along with auxiliary information provided by the game module 26 (block 60) to determine various parameters of the musical piece being played by the user. Examples of such parameters include, but are not limited to, the tone being played, the intensity of the tone, also referred to as the volume, the duration of the tone, and any additional characteristics that would assist in analyzing the playing of the musical piece by the user. Such additional characteristics may include, for example, instrument-specific measures, such as the volume of air that the user puts into a woodwind instrument, the accuracy of the timing and tempo a user plays a percussion instrument, the intensity that the user presses a piano key, or plays a guitar string, or other characteristics.

As shown by block 62, the analyzed information, including, for example, tone, volume, duration, and additional characteristics, is passed in real time to the game module 26 for use by the game module 26 to control an associated game of the game module 26, as is explained in detail hereinbelow. As shown by block 64, the game module then further compares the received analyzed information with the model input stored within the storage device 30, accesses the user performance accordingly, as described in further detail herein, and delivers real time feedback regarding the musical performance via visual or verbal output of the game. It should be noted that there may be another alternative output provided by the game, as long as feedback is provided to the user. It should also be noted that the feedback is not intended to be limited to real time feedback only. Non-real time feedback may also be provided.

It should be noted, that in accordance with an alternative embodiment of the invention, instead of providing a comparison to the model input stored within the storage device 30, the game module 26 may instead simply provide a user with a general assessment of their performance. Examples of such general assessments may take the form of providing the user with statistical information regarding their performance, such as numerical values associated with played tones, determined intensities, determined tone durations, and whether an improvised melody played by the user is musically pleasant by some measure or fits accompaniment music of the game.

Figure 5:
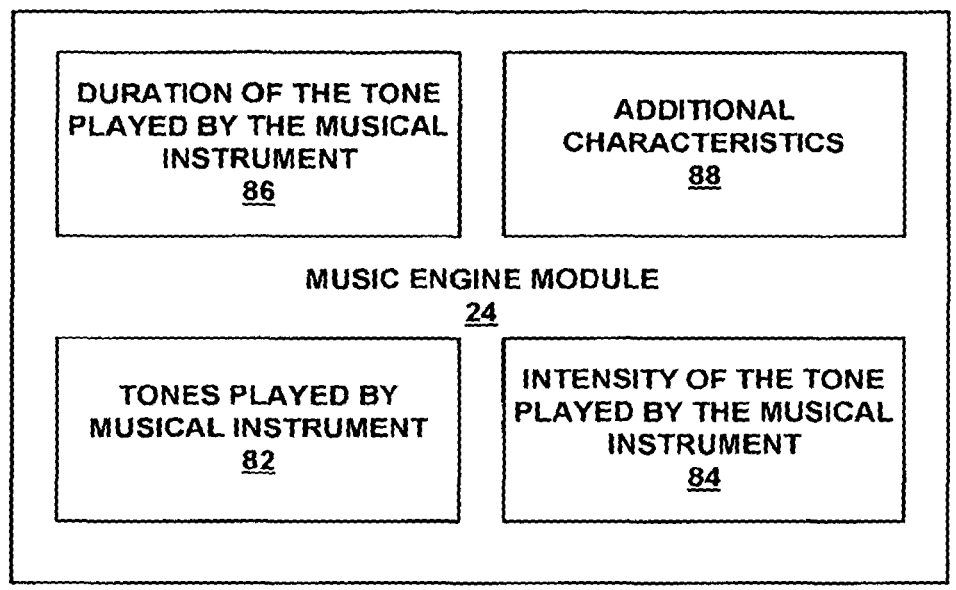
FIG. 5 is a schematic diagram illustrating results derived by the music engine module.

Having provided a top-level description of functions provided within the network, the following provides a further description of functions performed by the music engine module 24. As illustrated by the schematic diagram of FIG. 5, the music engine module 24 processes received audio digital samples to identify tones played by the musical instrument 82, to measure the intensity (volume) of the tone played by the musical instrument 84, to measure the duration of the tone played 86, and to determine additional characteristics 88.

Identify Tones

Figure 6:
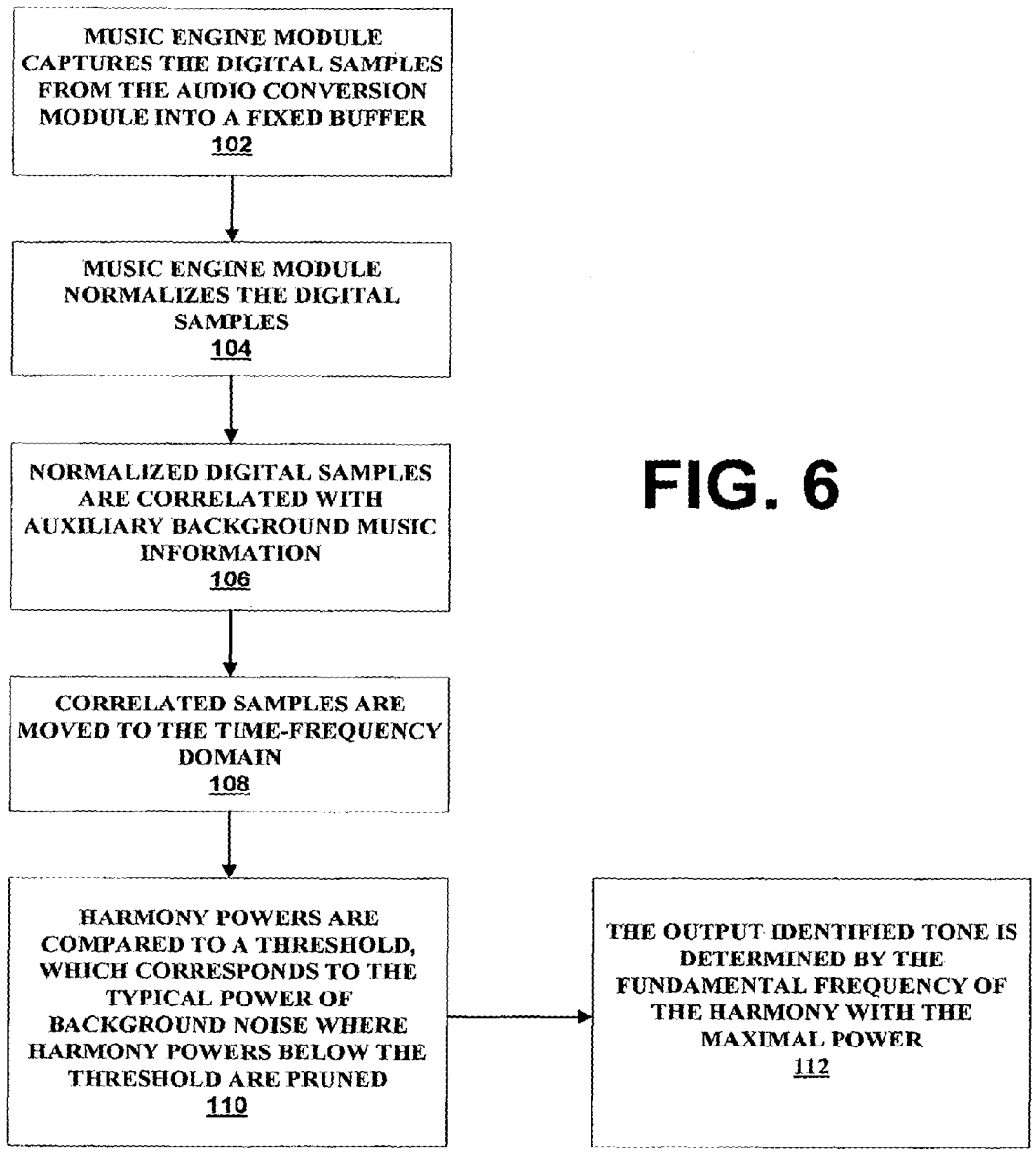
FIG. 6 is a flowchart further illustrating the process followed to identify tones in accordance with the present invention.

FIG. 6 is a flowchart 100 further illustrating the process followed to identify tones in accordance with the present invention. To identify tones, the music engine module 24 captures the digital samples from the audio conversion module 28 into a fixed buffer (block 102). As shown by block 104, the music engine module 24 then normalizes the digital samples. The normalization reduces the sensitivity to global changes in the signal amplitude and therefore increases the ability to analyze the structure of the signal. The normalization is performed on each data point $a_i$ in the buffer, $$\hat{a}_i = \frac{a_i}{\text{norm}(buf)}$$

where $$\text{norm}(buf) = \sqrt{\sum_{i=1}^{N} a_i^2} \quad (N \text{ is the buffer length}).$$

As shown by block 106, the normalized digital samples are then correlated with auxiliary background music information provided to the music engine module 24, by the game module 26. The auxiliary background music information is used to reduce the effect of known background music and separate the known background music from the audio signals generated by the musical instrument 6.

The correlated samples are then moved to the time-frequency domain (block 108). One way of moving the correlated samples to the time-frequency domain is by applying the Discrete Fourier Transform. It should be noted, however, that the present invention is not limited to use of the Discrete Fourier Transform. The frequency domain is separated into pre-defined frequency bands corresponding to the harmonies of expected instrument-dependent musical tones. These bands can be further adjusted to accommodate for the tones of interest, for example, by the specific learning method and by the level of the user. Harmony power of the tones is calculated by summing band powers related to each harmony. For each harmony $h_i$, the corresponding frequency bands are denoted by $\{b_{i,0}, \ldots, b_{i,j}, \ldots\}$. The harmony power of a tone is then given by the sum of the squared frequency amplitudes inside the band $b_{i,j}$ as represented by equation 1 below, $$hpow_i = \sum_j power(b_{i,j}), \text{ where} \qquad \text{Eq. 1}$$

$$power(b_{i,j}) = \sum_{f \in b_{i,j}} Amplitude_f^2.$$

For each frequency, the amplitude is defined as the norm of the imaginary and real parts of the Fourier result shown by equation 2, $$Amplitude_f = \sqrt{Im(Y_f)^2 + Re(Y_f)^2}, \qquad \text{Eq. 2}$$

where $Y_f$ is the Fourier result corresponding to frequency f.

As shown by block 110, the harmony powers are then compared to a threshold, which by default corresponds to the typical power of background noise where harmony powers below the threshold are pruned. It should be noted that the auxiliary background music information may be used for reducing the number of mistakes in identification of the tone. As an example, knowing the tone that the user is expected to play at a specific moment (if any), the system dynamically adjusts the threshold for the expected tone so that it will be recognized if played also in more difficult environmental conditions.

As shown by block 112, the output identified tone is determined by the fundamental frequency of the harmony with the maximal power. For all calculated powers $hpow_i$ that past the threshold, the maximal power $hpow_i$ is located, and the output identified tone is set to be the tone corresponding to that maximal power. If no harmonic power passes the threshold it is determined that no tone is actively being played. When using a short buffer, to reduce identification errors and prevent false-positive notes appearing for short duration, the music engine module 24 requires a minimal number of consecutive appearances of the same output identified tone before triggering it as the tone being played.

Moreover, once a certain note is triggered, the threshold for that note is also adjusted so that decision on a different note (or silence) requires stronger evidence to a change in tone. This prevents a stuttering effect that can be caused by a brief decrease in the intensity of the tone actually being played or increase in the background noise.

Identify Tone Duration

Tone duration is recognized by collecting concurrent appearances of an identified tone over time. Stability in this measure is obtained by ignoring random occurrences of other identified tones that are caused by noise in the audio input. Stability can be increased both by raising the threshold for background noise, and by lowering sensitivity to other tones, at the expense of temporal resolution.

Identify Tone Intensity

A known challenge in signal processing is the evaluation of the relevant signal intensity. In accordance with the present invention, the intensity of the played tone, also referred to herein as velocity, is of interest. One manner of determining the intensity of the played tone is to calculate the overall signal amplitude during the measured time window. This method is highly sensitive to global changes in the amplitude including background sounds, distance from the microphone, and noise. Another manner of determining the intensity of the played tone is to find the filtered signal amplitude only in the frequency ranges corresponding to the identified tone (i.e., the harmony power previously calculated). This approach reduces considerably the sensitivity to non-relevant sounds, such as, for example, background noise. To further improve evaluation of the intensity of the played tone, instrument-specific methods that use the characteristics of the musical instruments may be used, as described hereinbelow.

Use of Instrument-Specific Characteristics

As previously mentioned, one method used by the music engine module 24 is to use specific characteristics of the musical instrument, which are a portion of the auxiliary information, to improve both quality of recognition of tones and to deliver more accurate parameters for measuring the quality of the user performance. The use of auxiliary information allows for the use of non-conventional information in the music signal analysis process performed by the music engine module 24, such as, for example, but not limited to, what instrument is supposed to be played and what note is supposed to be played at a specific time. By using auxiliary information, identification accuracy is greatly improved. As a result, the signal analysis process described herein is not performed with a purely theoretic-generic point of view, but instead, a-priori knowledge is used to greatly improve signal analysis accuracy.

For example, in various woodwind instruments, the played intensity modifies the signal pitch. It should be noted that the played "intensity" here relates to the intensity that the user blows into the musical instrument, namely, the volume of air put into the musical instrument.

By modeling these changes in signal pitch one can determine the objective tone intensity and output a stable measure, unaffected (to a reasonable extent) by background noise, and the distance of the instrument from the microphone. Specifically, the relative location of average pitch in the leading band can be found, namely, the frequency band containing the fundamental frequency of the identified harmony. If the leading frequency band of the identified tone is denoted as $b_0$ containing all frequencies in the range $f_1 \leq f < f_2$, the relative average pitch is given by $$\hat{f} = \frac{E_{b_0}[f] - f_1}{f_2 - f_1},$$

where $E_{b_0}[f]$ is the average frequency in $b_0$.

It should be noted that many more instrument-specific characteristics can be used to provide insight on the quality of the user performance using analysis of the audio. Examples of such instrument-specific characteristics include, but are not limited to, presentation of spurious frequencies that can indicate inaccurate usage of the instrument, the appearance and intensity of harmonic powers of the main frequency, and other characteristics.

In percussion instruments, as tones does not play a role, an important measure is identification of beat onset time. When a beat is played in a percussion instrument, an increase in the overall volume of the audio samples is expected. However, using just the increase in volume in identification provides poor results and is very susceptive to background noise.

For better performance, a beat-onset score is calculated. Using the auxiliary information, a set of frequencies $f_1, \ldots, f_n$ is defined. These frequencies are the frequencies that are most affected by the musical instrument, and display the sharp temporary increase in amplitude during a beat. The set $f_1, \ldots, f_n$ varies between instruments (for example snare drums vs. base drums) and is determined using the auxiliary information: it can be predetermined by knowing the instrument, or by having previous data of the user playing that instrument. Looking at the Fourier transform result in three consecutive time windows $t_1, t_2, t_3$ of analyzed samples, the beat-onset score is the number of frequencies among $f_1, \ldots, f_n$ that display a peak in amplitude in $t_2$ relative to $t_1, t_3$, meaning, that satisfy: $A(f, t_1) < A(f, t_2) > A(f, t_3)$ where $A(f,t)$ is the amplitude of the Fourier result corresponding to frequency f at time t.

The beat-onset score is then compared to a threshold, to determine if indeed the user played a beat in the percussion instrument. Auxiliary information is further used to dynamically lower the threshold when a beat is expected. Beat prediction is done both by knowing the game flow and by extrapolating on previous onset times of beats.

Game Environment

In accordance with the present invention, the tone, intensity of the tone, duration of the tone, and additional instrument specific characteristics or non-instrument specific characteristics (namely, global measures that can fit multiple instruments) are used in a game environment so as to provide the user with immediate real-time feedback regarding their instrument playing. This game environment keeps the user immersed in the game, thereby desiring to perform well and continue practicing. It should be noted that it is the immersion of the determined tone, intensity of the tone, duration of the tone, and additional instrument specific characteristics or non-instrument specific characteristics, into the characters, objects, and environment provided by the game that provides the enhanced learning environment, as is described in detail hereinbelow. It should also be noted that the following merely provides examples of ways in which the real time calculated tone, intensity of the tone, duration of the tone, and additional instrument specific characteristics may be used in a game environment, however, the present invention is not intended to be limited in application to the following exemplary game environments. In addition, all of the calculated elements need not be used by the game.

As is described in more detail hereinbelow, unlike most of the "aim and shoot" games, focusing on hand-eye coordination and on speed-angles evaluation capabilities, the user in the present game environments will need to acquire music-specific skills to advance in the game, including accurate sound production (both pitch and duration), instrument related hand coordination, musical hearing, note apprehension, and more.

Success is achieved by demonstrating a set of the skills according to the difficulty of the specific level. The user may receive positive feedback (accumulating game points) when he/she demonstrates the required skill, and when he/she does not, he/she will receive negative visual feedback, as well as guidance on how to improve.

The game is built for repetitive practice of a certain set of music skills that need to be demonstrated in order to receive awards and progress in the game, which provides natural incentive for the player to practice this set of skills over and over until mastering them. The musical requirements of a level in the game are presented to the user visually as a challenge in the game (e.g., cross a set of floating stairs, navigate through obstacles, and protect himself from enemies). Each challenge in the game corresponds to an actual "learning challenge" in musical education learning, such as, but not limited to, playing a tone stably, identifying tones by hearing, playing a melody in a correct rhythm and timing, and even memorizing an entire melody by heart.

The game environment uses unique techniques, as described hereinbelow, to introduce the user to musical terms and musical language. For example, the tone duration may be visually demonstrated by length/size of the characters, the intensity level may be demonstrated by the character height, as demonstrated in a "Flying" game described hereinbelow, high and low tones may be translated to physical height on the screen, and the positions of the targets in a "Target" game described hereinbelow may correspond to real musical notes. Musical accompaniments of the different game levels expose the user to different types of musical styles and also help with tempo and timing. The below-described games use the results of the analyzed audio waves for controlling the flow of the game and influencing the movements of characters on the computer screen. The daily, somewhat technical, routine of musical practice becomes an attractive experience via the visual effects, the tailor-made musical arrangements and prizes the user can collect in the game. The following description provides for three (3) games, namely, a "Target Game," a "Flying Game," and a "Follow me Game."

Target Game

Figure 7:
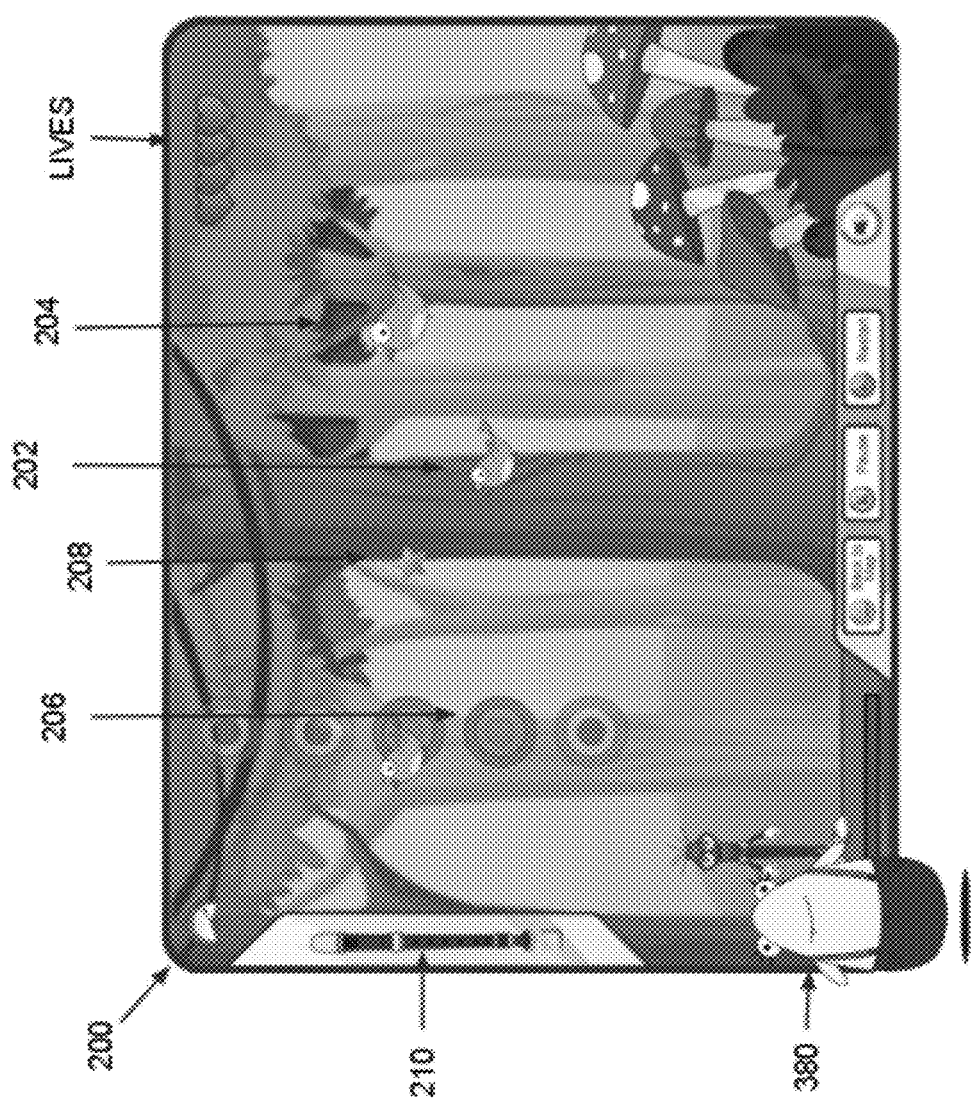
FIG. 7 is a screen view providing an example of a screen shot of the target game.

FIG. 7 is a screen view 200 providing an example of a screen shot of the target game. In the target game the user accumulates points by playing a sequence of specific tones at specific times for specific durations. The required tones and durations are represented by the location, size, and appearance of moving characters. Specifically, a smaller bird 202 represents a tone with a shorter duration, while a bigger bird 204 represents a tone with a longer duration.

The characters, in this case, birds, move across the screen so as to match a predetermined musical sequence constructing a melody. Several targets 206 are located on the screen view 200. At first, these targets 206 are presented to the user. Each target 206 is activated as a user plays a certain tone. Once the targets 206 are presented, accompaniment music begins and characters 202, 204 start moving toward the targets 206. As the character 202, 204 overlaps a target 206, the user is cued to play the tone corresponding to the target 206, for the correct duration. All the parameters (tone, timing, duration, and additional instrument-specific characteristics) are measured within a time window allowing for small inaccuracies. Each of these measures can be further tuned to increase the difficulty level of the game. For example, a skew in a certain amount in the timing that the players play the expected tone is allowed. The skew can be adjusted (e.g., 20 ms, 50 ms, 100 ms), so as to increase or decrease the difficulty level and how accurate the user is required to be.

Even if the user played the correct tone at the correct time, the user is required to continue playing the tone for a minimal duration, which is made clear to the user by the animations of the birds. Specifically, prior to playing, the size of the bird represents a required duration of the tone. The user is cued to start playing the tone as the bird reaches the target. As the user plays the tone, the bird size increases in animation gradually until the user plays for the full required duration, and then the bird fades and the user receives points, indicating to the user that he can stop playing the tone.

Stars 208 are introduced to prevent continuous playing of the musical instrument by the user by limiting the time that a user can play the same tone, and to prevent playing tones when not expected to general. As an example, the stars also progress along the screen right to left, similar to the characters. Once a star reaches any of the target, it will explode if the user plays any tone at that time. Thus, to succeed the player must not play any tone as a star is in a "target zone."

In the target game, a user begins the game with multiple lives. In accordance with the present game, when the user fails to play the tone at the correct time, the bird passes the target and one "life" is lost. As shown by the screen view 200 a graphical indication 210 of the tone currently being played is also provided within the screen view 200.

A positive score is bestowed when the user plays the expected tone at the correct time and duration. The accurate timing is encouraged by differential scoring giving preference to precise timing.

In an advanced level, to encourage memorization of the melody by heart, the characters may advance very fast or unexpectedly to the targets. This makes it difficult for the user to rely on the graphical representation, and following several failures, the user gradually learns the melody by heart to overcome this difficulty.

Flying Game

Figure 8:
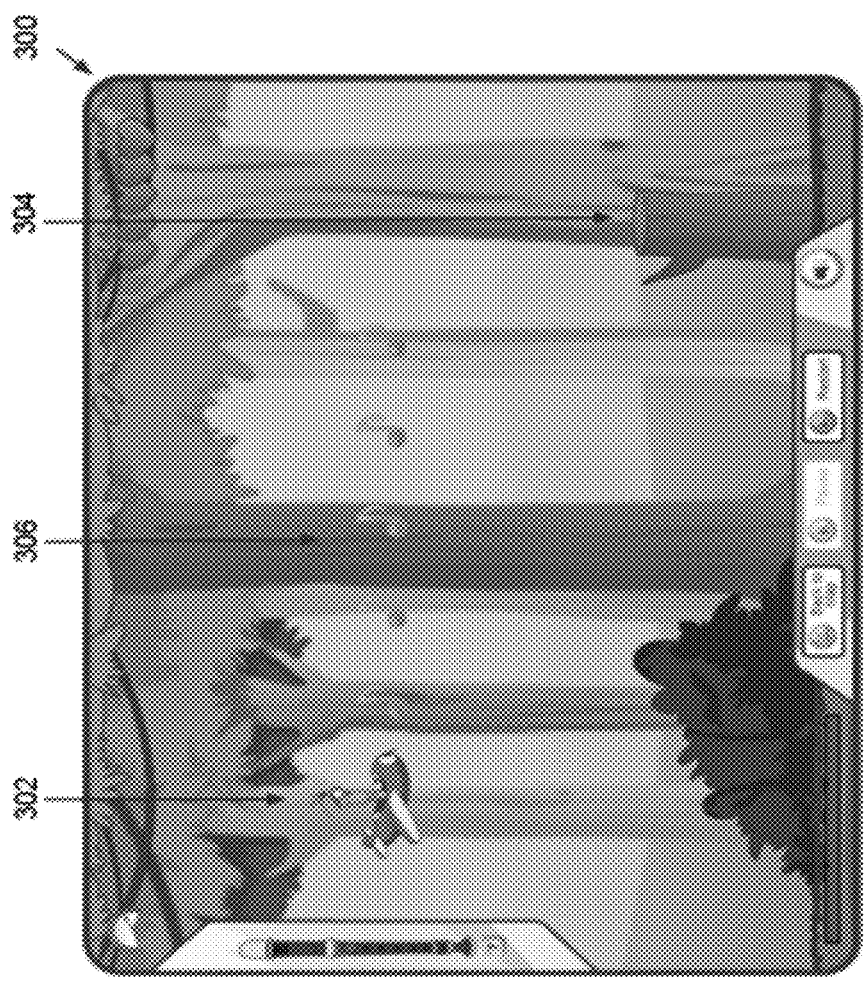
FIG. 8 is a screen view providing an example of a screen shot of the flying game.

FIG. 8 is a screen view 300 providing an example of a screen shot of the flying game. In the flying game the user maneuvers a character 302 using intensity of specific tones, while collecting bonuses and avoiding obstacles 304. An example of an obstacle 304 is the tree log illustrated in the screen view 300. In addition, the screen view 300 illustrates the use of golden notes 306 for providing bonuses. Specifically, to collect golden notes 306, the user is required to play the tone at a stable volume level. When the character 302 goes through a golden note 306, a bonus is awarded by the game.

The character 302 height is determined by the intensity of a certain tone played by the user, or a set of various tones played by the user, where a lower volume is interpreted as reduced height and a higher volume is interpreted as increased height. In addition, tone intensity stability is defined as the ability to maintain a fixed intensity of a played tone over time. The user is encouraged to practice producing stable sounds by organizing the obstacles and prizes in horizontal lines corresponding to a specific intensity level.

Follow Me Game

Figure 9:
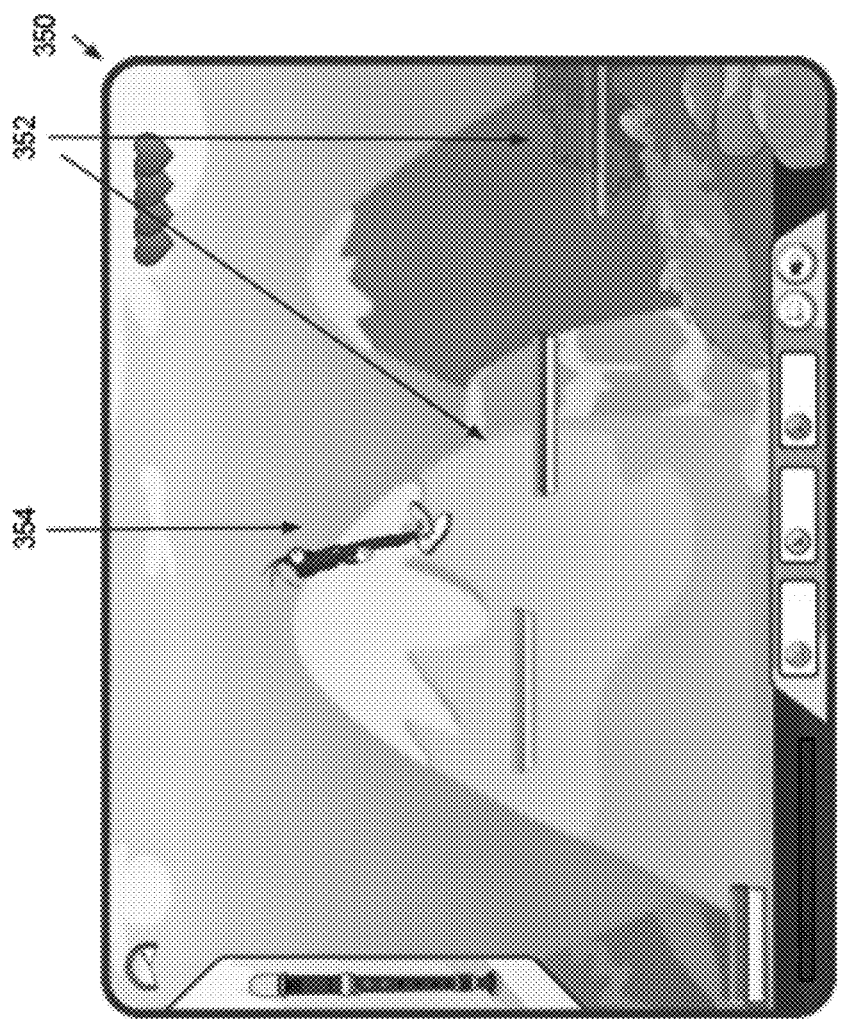
FIG. 9 is a screen view providing an example of a screen shot of the follow me game.

FIG. 9 is a screen view 350 providing an example of a screen shot of the follow me game. In the follow me game the computer produces a series of tones that the user has to repeat with the musical instrument.

In the follow me game illustrated by FIG. 9, the user is required to play a sequence of three different tones. The tones are graphically represented by steps 352 and a character 354 jumps between the steps 352 when the user plays the correct tones. Height of the steps 352 is correlated to the tones, where lower steps are for lower tones and higher steps are for higher tones.

The duration of the tone is also taken into account. A distance between steps represents tone duration. The expected duration can affect the appearance and animation, including the step width, the jump velocity and curvature, and more. Alternatively, the length of a step could represent duration and the distance between steps could represent the rest time between tones.

For all of the games, after completing a sequence, the user may advance to a next sequence of tones, until a final destination is reached.

It should be noted that each game may provide, but is not required to have, a musical wizard, as described hereinafter. The musical wizard provides visual and/or audio feedback, help, and/or advice to the user as described herein.

A wizard character 380 may be positioned on the screen for a game being played by the user and acts as the visual and/or audio communication point with the user. It should also be noted that the musical wizard may use other methods for providing audio feedback, help, and/or advice to the user, such as, but not limited to, vibration, smells, and other methods. In fact, the musical wizard may be provided without use of a wizard character 380, in which case guidance may be provided to the user without animation of the wizard character, either on the screen, via audio input, or via another method.

Functionality of the game module 26 allows the game to utilize expert musical knowledge to automatically analyze and detect common playing mistakes. The detection is performed using the knowledge of the expected note at each point in the game versus the extracted parameters of the user input. At this point the parameters include the analyzed audio signal and extracted parameters from it, including the instrument-specific characteristics, however, they can easily be extended to additional input sources, such as specific configurations, real time video capture, and more.

The functionality of the wizard, as provided by the game module 26, is capable of detecting many different categories of mistakes. Examples of such mistakes include, but are not limited to, incorrect timing, incorrect tone, incorrect duration and incorrect volume. In addition, the wizard functionality is capable of determining more advanced instrument specific mistakes, such as, but not limited to, holding and handling the instrument inaccurately, and subtle sound characteristics, by use of audio analysis and/or visual analysis. As an example, an audio signature of a mistake in holding the instrument may be stored so as to allow for detection of inaccurate finger placement with detection of the audio signature associated with the mistake. A database of common player mistakes per instrument is provided within the storage device 30. Such common mistakes may be provided by consulting with music educators or provided in another manner. For each common mistake a recognition pattern is found, using analysis of sample recordings and knowledge of the musical instrument. The recognition pattern holds information as to the expected audio presentation of the mistake. Examples of such information may include, but are not limited to, incorrect tones, presence of spurious tones, incorrect intensities, incorrect durations, or any combination of these, or other anticipated mistakes. As an example, when a user holds a recorder incorrectly, and not all holes are fully closed, a higher frequency sound appears. In addition, when a user blows too strong on a recorder a slight ascent in pitch occurs.

In a guitar, plucking the strings inaccurately, results in additional spurious frequencies appearing in the audio—thus presence of spurious frequencies in the audio pattern is the recognition patter for inaccurate plucking of the strings in the guitar. In more advanced levels more subtle characteristics of the tone played are also used for providing feedback and guidance. For example, the correct manner of producing a tone in the recorder is not solely by exhaling air, but by Tonguing (i.e., silently say the word "Tu" for each note), and this can be noticed in the audio samples. Thus, absence of this in the audio samples is the recognition pattern for a wrong manner of producing the tone. Of course, other mistakes may have recognition patterns held.

A musical performance assessment application of the wizard may receive as input expected notes and parameters of the user input (derived by the music engine module 24 from the various input sources) and searches the storage device 30 for a match to a common mistake recognition pattern. When a match is found, a relevant feedback is delivered to the user, informing him/her of the mistake he/she has made and guiding the user on how to avoid the mistake. The feedback may be provided either by a direct message, such as by voice/text, or by a representation of the error by a graphical effect or sound effect, or use of another feedback mechanism.

While the present system and method is not limited by the types of feedback that may be provided to the user, a few examples of feedback include, but are not limited to, guidance regarding instrument operation and handling, creating steady tones, maintaining tone/sound intensity and duration, sound creation characteristics, preventing playing when a user should not be playing (feedback related to the musical piece, not just the instrument playing), and correct tone/sound.

Figure 10:
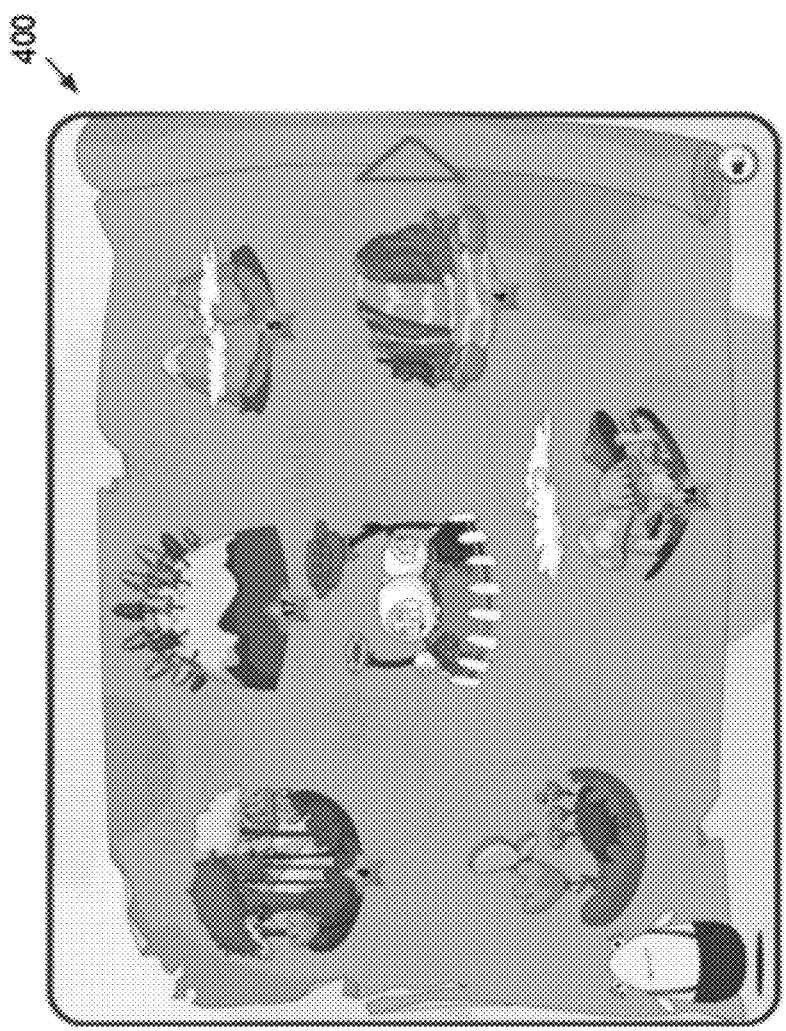
FIG. 10 is a screen view providing an example of multiple worlds that may be provided to provide a game environment.

To provide a more appealing game environment, each game may take place in a series of worlds in which a musical challenge gradually becomes more difficult and a variety of melodies are taught. In each world the user is expected to produce tones that are marked both with their musical names and with visual representation. An example of a screen view 400 illustrating multiple worlds is provided by FIG. 10.

The level of difficulty increases as the user advances and additional musical capabilities are required, whilst allowing repeated rehearsals of the notes the user has learned to play. The user can select any of the worlds according to the level he/she has reached or can choose to go back to worlds he/she already played to accumulate more points/prizes. It should be noted that providing a series of worlds is not a requirement of the present invention.

In accordance with an alternative embodiment of the invention, even at his/her first steps in the world of music, the user is provided with the chance to play accompanied by other instruments and in a group, while receiving instructions via the visuals provided by the games on the screen. Other than specific feedback on mistakes provided by the wizard, the user constantly receives instant visual feedback on his/her performance, as previously described, so that he/she can immediately correct mistakes in real-time while playing the game. As an example, a game character will fly "too high" if the user blows a woodwind instrument too strong, and the user immediately sees this and blows weaker. In parallel, the formal music notes are gradually introduced. As in all game levels the height of a character, target, or other game objects are correlated to the note, just as in standard sheet notation. Therefore, the concepts of a "high note" and "low note" are implicitly introduced and the user also learns how the tones and the written musical notes are connected.

In accordance with another alternative embodiment of the invention, to encourage practice using the musical instrument, the computer harnesses natural motivation of a user to repeat challenges in areas in which they are confident that they will succeed. A collection of songs and melodies that the user has learned may be accumulated in a "repertoire list" stored within the storage device, or within a remote or removable device, which the user can see.

The user can choose to increase the score and gain prizes by rehearsing pieces that he/she has already learned. In the repertoire, the user will be able to play learned melodies for fun, to record him/herself, or even play before a virtual audience that will provide feedback similar to that of a real audience. The games may also provide the user with proof of achievement, such as, for example, but not limited to, certificates that the user can print and show to teachers/parents.

While the abovementioned provides a description of the present invention as being provided between a single user and a computer, it should be noted that multiple players may compete in a single game on one computer, either by taking turns or by playing at the same time with each player being associated with different characters.

In addition, it should be noted that in accordance with an alternative embodiment of the invention, multiple players may compete in a game while playing from locations that are remote from each other. In such an embodiment, each user would have a separate computer 10 as described hereinabove, where a first computer of a first user would be in communication with a second computer of a second user. Communication between such computers may be provided in one or more of many different methods, such as, but not limited to, by communicating via the Internet, via wireless communication, via a wired connect, or via a local area network.

Still further, as shown by FIG. 11, the present system and method may be provided on a server 500 where multiple users may play games available by communication with the server 500 via individual computers, such as the first computer 502 and second computer 504 illustrated by FIG. 11. Communication with the server 500 may be provided by one or more of many different communication methods, such as, but not limited to, via the Internet 506, via wireless communication, via a wired connect, or via a local area network.

As previously mentioned, the present system and method may also be provided for use in developing musical skills that are not associated with instruments, such as, but not limited to, vocal training and whistling. In such an embodiment, there would be no need for a musical instrument. Instead, sound produced by a user may be supplemented. In such an embodiment, audio signal analysis and other properties provided by the present system and method would be the same, however, the source of the musical signal would be produced by the user without a musical instrument.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

We claim:

1. A method comprising:
    presenting, at a computer screen, a graphical representation of a game environment that includes visual cues to produce one or more sounds, with a musical instrument, having certain desired musical parameters indicated by the visual cues;
    receiving, at a microphone, sound waves from the musical instrument being played by a user of the game;
    converting the sound waves into electrical signals with the microphone;
    converting the electrical signals into digital samples with a computer-based audio conversion module;
    analyzing, with a computer-based music engine module, the digital samples along with auxiliary information from the computer-based audio conversion module, to determine various actual parameters of a musical piece being played by the user of the game on the musical instrument, wherein the auxiliary information includes a-priori data related to at least one element selected from the group consisting of a musical instrument being played, a technical environment, the computer game, and information regarding the user of the game,
    recognizing one or more actual musical parameters associated with each sound created by the user based on the analysis;
    controlling, with a computer-based game module, the game based on information from the analysis, wherein the computer-based game module compares the information from the analysis with a model input stored in a computer-based storage device, assesses performance of the user, and delivers feedback regarding the performance of the user via visual or verbal output of the game,
    wherein delivering the feedback regarding the performance of the user via the visual or verbal output of the game comprises controlling, an appearance of one or more elements of a character of the game on the computer screen based on one or more of the determined musical parameters associated with each sound created by the user playing the musical instrument, wherein the controlled elements are selected from the group consisting of length of a character in the game, a size of a character in the game, a height of a character in the game, and a location of a character in the game, and
    wherein each respective change in each of the one or more controlled elements is based entirely on a corresponding one and only one of the sounds created by the user; and
    providing an award or allowing progress in the game based on how closely the one or more actual musical parameters correspond to the desired musical parameters,
    wherein the visual cues are not musical notes on a musical staff,
    wherein the visual cues are objects that appear at different heights,
    the method further comprising:
    presenting, at the computer screen, the character as one that moves relative to the visual cues,
    wherein the character has a height on the computer screen, as it passes each one of the visual cues, that is determined by a volume of a tone played by the user with the musical instrument, where a lower volume is interpreted as a first height and a higher volume is interpreted as a second height,
    wherein, the user, to collect notes, is required to play the tone at a stable volume level and when the character goes through one of the notes, a bonus is awarded by the game.

2. The method of claim 1, wherein at least one of the various parameters is a tone of the musical piece, and wherein the step of analyzing the digital samples comprises the steps of:
    normalizing the digital samples;
    correlating the normalized digital samples with the stored model input, which comprises background music information;
    moving the correlated samples to a time-frequency domain;
    comparing harmony powers of the tone to a predefined threshold; and
    determining a fundamental frequency of the harmony powers with a maximum power.

3. The method of claim 2, wherein correlated samples are moved to the time-frequency domain by applying a discrete Fourier transform.

4. The method of claim 1, wherein at least one of the various parameters is a tone duration, and wherein the step of analyzing the digital samples further comprises the step of collecting concurrent appearance of an identified tone over time.

5. The method of claim 1, wherein at least one of the various parameters is a tone intensity of the musical piece, and wherein the step of analyzing the digital samples further comprises the step of calculating an overall signal amplitude during a measured time window.

6. The method of claim 1, wherein at least one of the parameters of the musical piece is a tone intensity of the musical piece, and wherein the step of analyzing the digital samples further comprises the stop of finding a filtered signal amplitude only in frequency ranges corresponding to an identified tone.

7. The method of claim 1, wherein the various parameters are recognized in real time so as to control elements of the game in real time.

8. The method of claim 1, wherein the user interacts with the game via the Internet.

9. The method of claim 1, wherein the actual and desired musical parameters include one or more of tone, intensity of the tone, duration of the tone, volume of a tone, and additional characteristics that are specific to an instrument being played by user or non-instrument-specific characteristics that can fit multiple instruments that the user may be playing.

10. The method of claim 1, wherein recognizing the one or more actual musical parameters comprises recognizing a tone, a volume and a duration associated with each sound created by the user,
    wherein controlling the one or more elements of the character is based on the recognized tone, the recognized volume and/or the recognized duration, and
    wherein providing the award or allowing the progress in the game is based on how closely the recognized tone, the recognized volume and/or the recognized duration correspond to the desired musical parameters.

11. The method of claim 10, wherein each sound produced by the user causes a change in a visual appearance of one or more of the elements of the character on the screen depending on how the recognized tone, the recognized volume or the recognized duration of that sound correspond to one or more of the desired musical parameters.

12. The method of claim 11, wherein the visual appearance changes to more closely correspond to an associated one of the visual cues if the recognized tone, the recognized volume or the recognized duration of the sound closely correspond to one or more of the desired musical parameters.

13. The method of claim 11, wherein the visual appearance changes to less closely correspond to an associated one of the visual cues if the recognized tone, the recognized volume or the recognized duration of the sound does not correspond to any of the desired musical parameters.

14. The method of claim 1, further comprising the user of the game playing the musical instrument.

\* \* \* \* \*